United States Patent
Arie et al.

(10) Patent No.: US 7,778,743 B2
(45) Date of Patent: Aug. 17, 2010

(54) REMOTE CONTROL DEVICE AND REMOTE CONTROL METHOD FOR VEHICLE

(75) Inventors: Shinichi Arie, Saitama (JP); Masahiko Asakura, Utsunomiya (JP); Suguru Asakura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 649 days.

(21) Appl. No.: 11/701,607

(22) Filed: Feb. 2, 2007

(65) Prior Publication Data
US 2007/0191998 A1    Aug. 16, 2007

(30) Foreign Application Priority Data
Feb. 16, 2006    (JP)    .............................. 2006-038935

(51) Int. Cl.
*H03K 21/38*    (2006.01)
*E05B 65/12*    (2006.01)

(52) U.S. Cl. ....................... 701/2; 377/107; 340/426.13; 340/426.36; 340/426.16; 340/428; 340/430; 70/57.1; 70/256; 307/10.7

(58) Field of Classification Search ................. 341/176; 123/179.1, 179.2; 165/202
See application file for complete search history.

(56) References Cited

U.S. PATENT DOCUMENTS

| | | | |
|---|---|---|---|
| 4,458,446 A * | 7/1984 | Mochida et al. ................. 49/28 |
| 6,236,333 B1 * | 5/2001 | King ........................ 340/5.61 |
| 6,476,517 B1 * | 11/2002 | Okada ........................ 307/10.2 |
| 6,522,265 B1 * | 2/2003 | Hillman et al. ................. 340/988 |
| 6,670,883 B1 * | 12/2003 | Asakura et al. ................ 340/5.61 |
| 6,700,476 B1 * | 3/2004 | Okada et al. ................. 340/5.62 |
| 6,809,629 B2 * | 10/2004 | Heide et al. ................. 340/5.61 |
| 6,825,752 B2 * | 11/2004 | Nahata et al. ............... 340/5.64 |
| 6,831,547 B2 * | 12/2004 | Watarai et al. ............. 340/5.61 |
| 6,996,732 B2 * | 2/2006 | Kotlow et al. ................ 713/324 |
| 7,224,980 B2 * | 5/2007 | Hara ........................ 455/456.1 |
| 7,529,958 B2 * | 5/2009 | Roth et al. ................... 713/330 |
| 2002/0025823 A1 * | 2/2002 | Hara ........................ 455/456 |
| 2004/0070489 A1 * | 4/2004 | Ueda et al. ................. 340/5.61 |
| 2004/0075532 A1 * | 4/2004 | Ueda et al. ................. 340/5.72 |
| 2004/0122565 A1 * | 6/2004 | Sakurai et al. .................. 701/1 |
| 2004/0127265 A1 * | 7/2004 | Van Bosch et al. .......... 455/574 |
| 2004/0142732 A1 * | 7/2004 | Ueda et al. ............... 455/569.2 |
| 2004/0168098 A1 * | 8/2004 | Matsuoka et al. ........... 713/600 |
| 2004/0227656 A1 * | 11/2004 | Asakura et al. ............. 341/176 |

(Continued)

FOREIGN PATENT DOCUMENTS

JP    11-131884    5/1999

*Primary Examiner*—Jack Keith
*Assistant Examiner*—Jonathan M Dager
(74) *Attorney, Agent, or Firm*—Carrier, Blackman & Associates PC; William D. Blackman; Joseph P. Carrier (57) ABSTRACT

A counter increases a counted value at regular time intervals during a transmission time of a request signal Sr transmitted based on trigger signals input from a door unlocking sensor or the like. On the other hand, the counter decreases the counted value at regular time intervals during a non-transmission time of the request signal Sr. A determination unit either prohibits or permits transmission of the request signal Sr to a portable unit, based on comparison results of the counted value with a prohibition value and a lifting value.

8 Claims, 6 Drawing Sheets

U.S. PATENT DOCUMENTS

2005/0057408 A1* 3/2005 Asakura et al. ............. 343/711
2005/0162259 A1* 7/2005 Hotta et al. ............ 340/426.13
2005/0237161 A1* 10/2005 Lee et al. ................. 340/10.33
2006/0241817 A1* 10/2006 Patenaude ...................... 701/1
2006/0255908 A1* 11/2006 Gilbert et al. .............. 340/5.61

* cited by examiner

REMOTE CONTROL DEVICE AND REMOTE CONTROL METHOD FOR VEHICLE

BACKGROUND OF THE INVENTION

1. Field of the Invention

The present invention relates to a vehicular remote control device for controlling operation of a vehicle-mounted device based on a trigger signal from a predetermined switch operated by an operator such as a driver. The present invention also concerns a method of such remote control, and more particularly relates to a method of operating a vehicular remote control device for controlling transmission of a request signal when the request signal is transmitted from a transmitting unit of a vehicle-mounted device to a portable unit carried by the operator, based on input of a trigger signal from a predetermined switch of the vehicle, such as a door locking switch operated by the driver.

2. Description of the Related Art

Japanese Laid-Open Patent Publication No. 11-131884 discloses a conventional technology relating to a vehicular electronic key system, which initiates communications between a portable unit carried by an operator such as a driver and a vehicle-mounted device, based on a trigger signal serving as an activation signal output from a switch operated by the operator, which is disposed on the outer door handle or trunk lid of the vehicle, and which unlocks the doors when an ID transmitted from the portable unit to the vehicle-mounted device successfully matches an ID stored in the vehicle-mounted device.

In Japanese Laid-Open Patent Publication No. 11-131884, the vehicle-mounted device transmits a request signal from the transmitting unit thereof to the portable unit based on input of the trigger signal that requests transmission of a response signal including the ID. In this case, the vehicle-mounted device has a timer circuit for preventing the battery thereof from running out due to successive transmissions of request signals based on successive operations of the switch by the operator. Therefore, when the vehicle-mounted device has been operated for a time preset in the timer circuit, the vehicle-mounted device becomes idle regardless of whether the trigger signals are input or not, whereby transmission of the request signal is prohibited.

In such a system, if the trigger signal is input into the vehicle-mounted device every time that the operator operates the switch, the transmitting unit transmits a request signal to the portable unit every time that the trigger signal is input. As a result, since the total transmission time of the request signal becomes long during the predetermined period, the temperature rises inside the transmitting unit due to transmission of the request signal, which adversely affects the performance of the transmitting unit.

In addition, because the preset time is set in order to prevent the battery from running out, even when the total transmission time within the predetermined period of time is shorter than the preset time, a rise in temperature inside the transmitting unit may still adversely affect performance of the transmitting unit, before the timer circuit prohibits transmission of the request signal based on the preset time.

A predetermined waiting time between communication sequences between the vehicle-mounted device and the portable unit may be one option for limiting successive transmissions of request signals as a result of successive switching operations caused by the operator. Such a countermeasure, however, could decrease the merchantability of the vehicle-mounted device.

If a device that lowers the transmission level of the request signal is installed in the transmitting unit, for suppressing a rise in temperature thereof, the vehicle-mounted device may become prohibitively expensive.

SUMMARY OF THE INVENTION

It is a major object of the present invention to provide a vehicular remote control device, which suppresses rises in temperature in the transmitting unit of a vehicle-mounted device that communicates with a portable unit, while achieving reliable operation of the vehicle-mounted device and reliable transmission of request signals to the portable unit. A further major object of the invention is to provide a method of such remote control.

Another object of the present invention is to provide a vehicular remote control device employing a cost-saving vehicle-mounted device, as well as to provide a method for remotely controlling such a vehicle-mounted device.

A vehicular remote control device according to the present invention, for controlling operation of a vehicle-mounted device based on a trigger signal from a predetermined switch operated by an operator, comprises:

a counting unit for increasing a counted value at predetermined regular time intervals during an operation time of the vehicle-mounted device in response to inputting of the trigger signal, while decreasing the counted value at the predetermined regular time intervals during a non-operation time of the vehicle-mounted device; and a control unit for controlling permission and prohibition of the vehicle-mounted device operation based on comparison of the counted value with a predetermined threshold value.

Further, a method of vehicular remote control according to the present invention, for controlling operation of a vehicle-mounted device based on a trigger signal from a predetermined switch operated by an operator, comprises:

a counting step for increasing a counted value at predetermined regular time intervals during an operation time of the vehicle-mounted device in response to inputting of the trigger signal, while decreasing the counted value at the predetermined regular time intervals during a non-operation time of the vehicle-mounted device; and a controlling step for controlling permission and prohibition of vehicle-mounted device operation based on comparison of the counted value with a predetermined threshold value.

A vehicular remote control device according to another aspect of the present invention, for controlling transmission of a request signal when the request signal is transmitted to a portable unit from a transmitting unit of a vehicle-mounted device, based on a trigger signal input from a predetermined switch of a vehicle operated by an operator, comprises:

a counting unit for increasing a counted value at predetermined regular time intervals during a transmission time when the request signal is transmitted based on inputting of the trigger signal, while decreasing the counted value at the predetermined regular time intervals during a non-transmission time of the request signal; and a transmission control unit for controlling permission and prohibition of transmission of the request signal based on comparison of the counted value with a predetermined threshold value.

Further, a method of vehicular remote control according to another aspect of the present invention, for controlling transmission of a request signal when the request signal is transmitted to a portable unit from a transmitting unit of a vehicle-mounted device based on an trigger signal input from a predetermined switch of a vehicle operated by an operator, comprises:

a counting step for increasing a counted value at predetermined regular time intervals during a transmission time when the request signal is transmitted based on inputting of the trigger signal, while decreasing the counted value at the predetermined regular time intervals during a non-transmission time of the request signal; and a transmission controlling step for controlling permission and prohibition of transmission of the request signal based on comparison of the counted value with a predetermined threshold value.

With the above-mentioned arrangements, when a trigger signal is input to the vehicle-mounted device every time the operator operates the switch, the counting unit increases or decreases the counted value by judging whether or not the vehicle-mounted device is operable, or alternatively, by judging whether or not the request signal is transmittable. Based on comparison of the counted value with the threshold value, the control unit or the transmission control unit controls permission and prohibition for operating the vehicle-mounted device, or for transmitting the request signal.

Thus, based on the input trigger signal, the temperature of the transmitting unit rises during the operation time of the vehicle-mounted device, or during the time that the request signal is transmitted. On the other hand, when the trigger signal is not input, the temperature of the transmitting unit drops during the non-operation time of the vehicle-mounted device, or during the non-transmission time of the request signal.

The counter unit increases the counted value based on the temperature rise of the transmitting unit, during the operation time of the vehicle-mounted device or during the transmission time of the request signal. On the other hand, the counter unit decreases the counted value based on the temperature drop of the transmitting unit, during the non-operation time of the vehicle-mounted device or during the non-transmission time of the request signal. The control unit and the transmission control unit compare the counted value, which represents a current temperature of the transmitting unit, with a threshold value, and control permission and prohibition of operation of the vehicle-mounted device, as well as permission and prohibition of transmission of the request signal, respectively.

Therefore, according to the present invention, a temperature rise in the transmitting unit caused by operation of the vehicle-mounted device or by transmission of the request signal can be suppressed, while the vehicle-mounted device is reliably operated and the request signal is reliably transmitted to the portable unit from the transmitting unit.

Further, in the present invention, because permission and prohibition of operation of the vehicle-mounted device or transmission of the request signal can be controlled based on comparison results of the counted value with the threshold value, the initial costs for the vehicle-mounted device can be reduced.

The transmitting unit comprises a transmission circuit for converting the request signal into a signal that can be transmitted wirelessly to the portable unit, and an antenna for wirelessly emitting the converted request signal to the outside. The temperature rise in the transmitting unit should be interpreted as a temperature rise of both the transmission circuit and the antenna, which together constitute the transmitting unit.

For example, in the case that the trigger signal is input into the vehicle-mounted device every time that the operator operates the switch, a plurality of trigger signals are successively input to the vehicle-mounted device if the operator successively operates the switch, for purposes such as unlocking the vehicular doors.

Further, the operation time of the vehicle-mounted device is a period during which a current is supplied to the door locking actuator, for locking or unlocking the doors in a so-called keyless entry mode. The non-operation time of the vehicle-mounted device is a period during which current is not supplied to the door locking actuator.

The threshold value comprises a first threshold value and a second threshold value that is lower than the first threshold value. The control unit and the transmission control unit preferably prohibit operation of the vehicle-mounted device and transmission of the request signal, respectively, when the counted value exceeds the first threshold value. On the other hand, the control unit and the transmission control unit preferably permit operation of the vehicle-mounted device and transmission of the request signal, respectively, when the counted value falls to the second threshold value or lower.

This makes it possible to reliably control permission and prohibition of operation of the vehicle-mounted device, and transmission of the request signal, in response to a temperature rise in the transmitting unit.

Further, it is possible to reliably operate the vehicle-mounted device and reliably transmit the request signal within a range of the operating temperature of the vehicle-mounted device including the transmitting unit, by setting the first threshold value so as to correspond to an upper limit operating temperature, and setting the second threshold value so as to correspond to a predetermined temperature that is lower than the upper limit operating temperature.

Also, prohibition of operation of the vehicle-mounted device and transmission of the request signal is preferably lifted when the counted value falls to the second threshold value or lower, for thereby permitting operation of the vehicle-mounted device and transmission of the request signal.

In this manner, operation of the vehicle-mounted device and transmission of the request signal to the portable unit are efficiently and reliably controlled.

In addition, when the control unit or the transmission control unit judges that the counted value could exceed the first threshold value before the next regular time interval, operation of the vehicle-mounted device or transmission of the request signal may preferably be prohibited at that time.

In this manner, the transmitting unit is prevented from becoming deteriorated due to a rise in temperature of the transmitting unit.

The counter unit preferably increases the counted value by adding a first preset value at regular time intervals, during the operation time of the vehicle-mounted device or during the transmission time of the request signal. On the other hand, the counter unit preferably decreases the counted value by subtracting a second preset value at regular time intervals during the non-operation time of the vehicle-mounted device or during the non-transmission time of the request signal.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
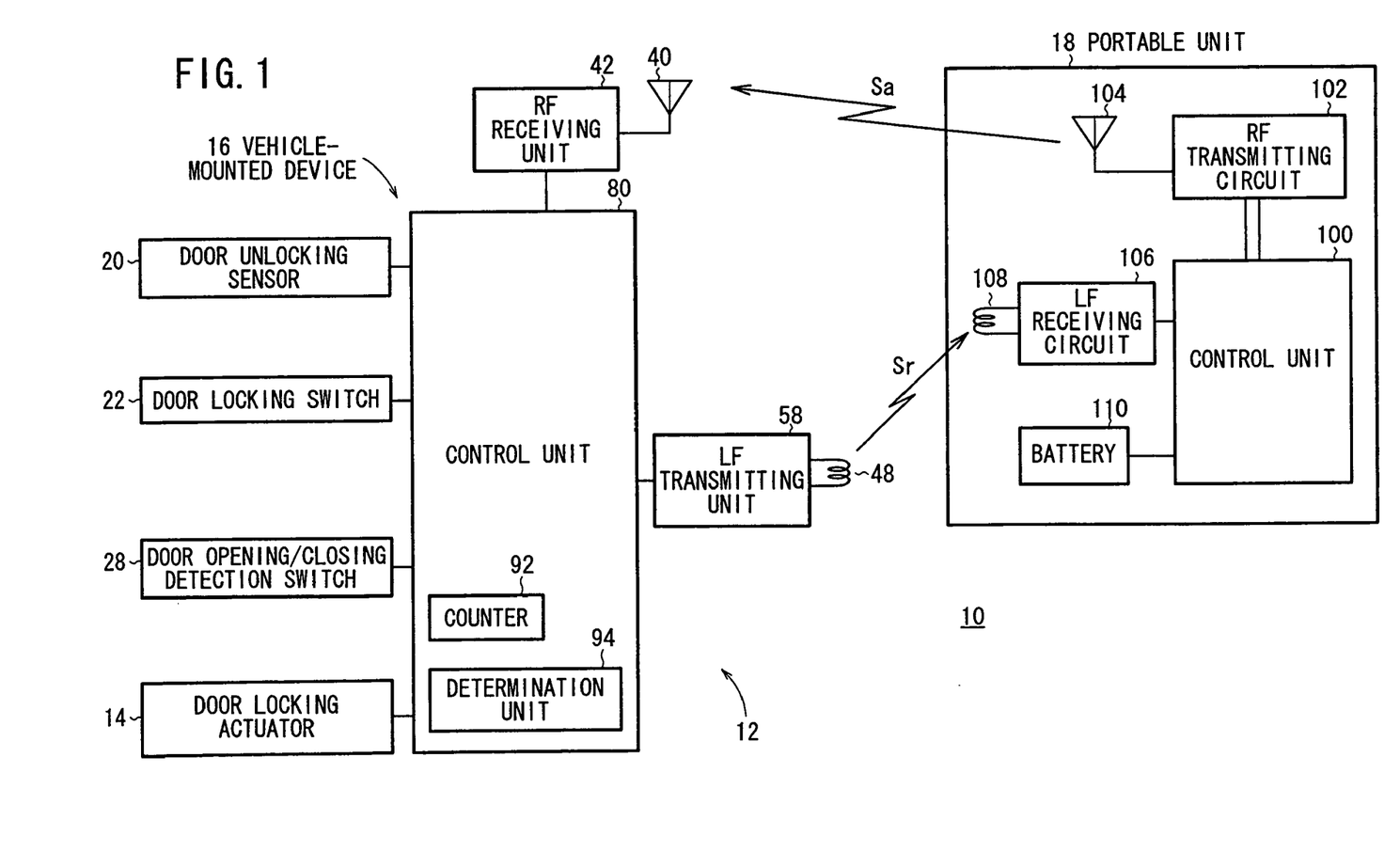
FIG. 1 is a block diagram of a vehicular remote control device according to an embodiment of the present invention.
Figure 2:
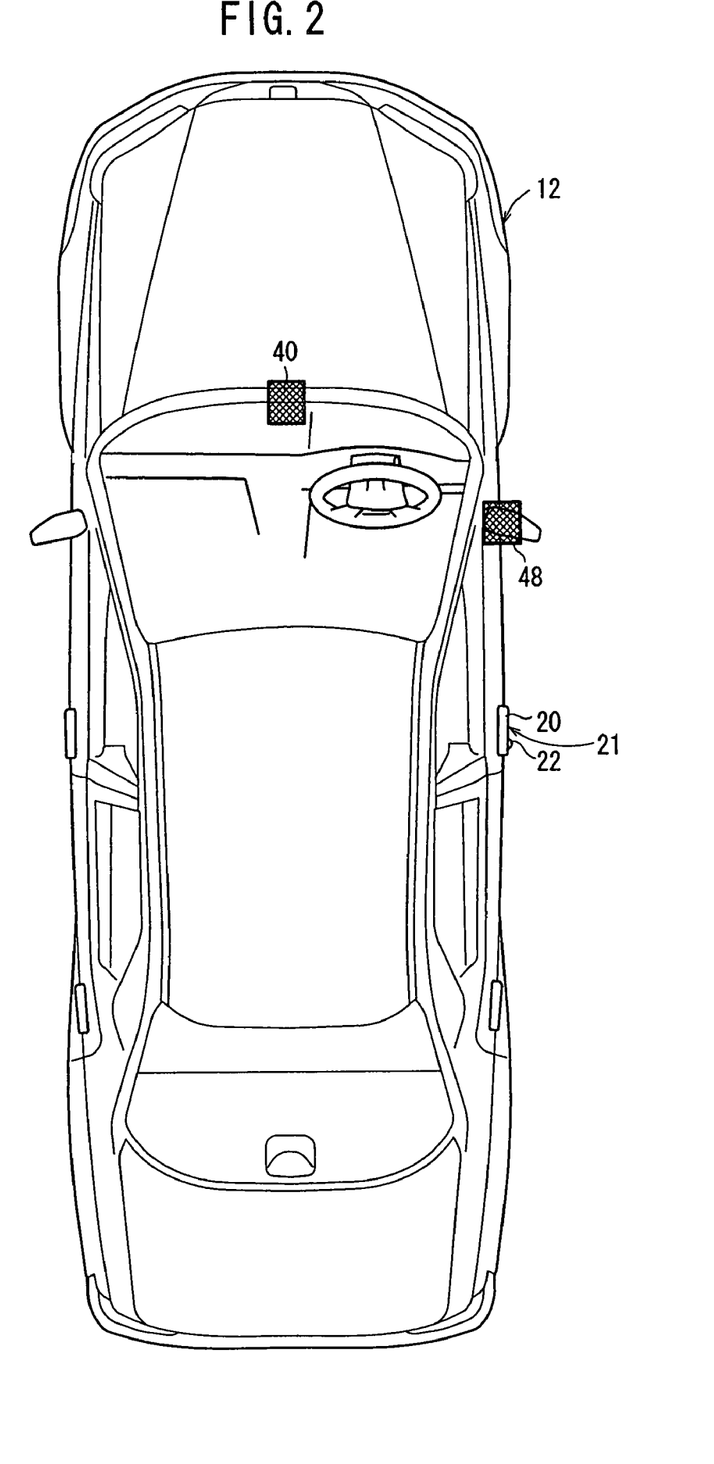
FIG. 2 is a plan view schematically illustrating a vehicle to which there is applied a system for using the remote control device shown in FIG. 1.

As shown in FIGS. 1 and 2, a vehicular electronic key system (vehicular remote control device) 10 according to an embodiment of the present invention generally comprises a vehicle-mounted device 16 mounted on a vehicle 12, and a portable unit 18 which is carried by the user (operator) of the vehicle 12, e.g., the driver, and which performs radio communications with the vehicle-mounted device 16.

Although the portable unit 18 may be a card key including an IC chip (not shown) or a conventional key, the portable unit 18 used in the present embodiment is a card key that can start the engine of the vehicle, even when the card key resides in a pocket of the operator.

The portable unit 18 includes a battery 110 such as a button cell, a control unit 100, an LF receiving antenna 108 for receiving a request signal Sr of an LF signal having a frequency of, for example, 125 kHz, an LF receiving circuit 106 connected to both the LF receiving antenna 108 and the control unit 100, an RF transmission antenna 104 for transmitting a response signal Sa of an RF signal having a frequency of, for example, 315 MHz, and an RF transmitting circuit 102 connected both to the RF transmission antenna 104 and the control unit 100.

The control unit 100 is usually in sleep mode. When an activation request signal, including an activation code for activating the control unit 100 and requesting a response signal, is initially transmitted from the vehicle-mounted device 16, the control unit 100 of the portable unit 18 wakes up, i.e., is activated, from the sleep mode. In this manner, the portable unit 18 saves power.

The request signal Sr transmitted to the portable unit 18 from the vehicle-mounted device 16 is composed of the activation request signal, having a relatively small quantity of data including the activation code to activate the portable unit 18, and a challenge code request signal, having a relatively large quantity of data including a challenge code for ensuring security.

The activation request signal and the challenge code request signal may be transmitted at once, or the activation request signal may be transmitted first, wherein the challenge code request signal is then transmitted after authentication is performed, for example, by matching a response signal Sa transmitted from the portable unit 18 in response to the activation request signal. Usually, an ID stored in the portable unit 18 is read out therefrom and contained within the response signal Sa.

On the other hand, the vehicle 12 includes an ECU as a control unit 80, to which the components described below are connected.

An outer door handle 21 of the driver's door of the vehicle 12 includes a door unlocking sensor 20, which is used for unlocking the doors, and a door locking switch 22, which is used for locking the doors.

The door unlocking sensor 20 is disposed on a surface of the outer door handle 21, on a side thereof that faces the vehicle body, that is, on the inner surface of the outer door handle 21. The door unlocking sensor 20 is composed of a switch utilizing an electrostatic capacitive touch sensor. The door unlocking sensor 20 is normally placed in an off-state. When the operator grips the outer door handle 21, and more precisely when the operator's fingers touch the inner surface of the outer door handle 21, the door unlocking sensor 20 is turned on, and outputs signals, that is, trigger signals, at a predetermined level.

On the other hand, the door locking switch 22 is disposed on a surface of the outer door handle 21, on an outer side thereof. The door locking switch 22 comprises a mechanical switch such as a microswitch. The door locking switch 22 also is normally turned off. When turned on and placed in operation, i.e., when an operator's finger presses a button that is mounted on the outer surface of the outer door handle 21, the door locking switch 22 outputs signals, that is, trigger signals, at a predetermined level.

Each of the doors of the vehicle 12 includes a door switch 28 for detecting whether the door is open or closed (see FIG. 1). The door switch 28 is turned on when the door is open, and turned off when it is closed.

Further, each of the doors comprises a door locking actuator 14 for locking or unlocking the door.

An LF transmission antenna 48 for establishing extravehicular communications is mounted on a side mirror on the driver's side. In this case, the LF signals, which act as request signals, from an LF transmitting circuit 58 connected to the LF transmission antenna 48 are transmitted through the LF transmission antenna 48 wirelessly, and are received by the LF receiving circuit 106 of the portable unit 18 through the LF receiving antenna 108.

The vehicle 12 further comprises an RF unit comprising an RF receiving antenna 40 and an RF receiving circuit 42 disposed underneath the instrument panel. In this case, RF signals, which act as response signals Sa, are transmitted from the portable unit 18 through the RF transmission antenna 104 in response to the request signals Sr, and are received on the vehicle side through the RF receiving antenna 40 of the vehicle-mounted device 16, so as to authenticate the response signals Sa between the vehicle-mounted device 16 and the portable unit 18, or more precisely, between the control unit 80 of the vehicle-mounted device 16 and the control unit 100 of the portable unit 18.

The LF transmission antenna 48 has a predetermined effective transmission range (not shown) around the vehicle 12, such that the range outside the vehicle has a radius substantially corresponding to the length of the operator's, i.e., the driver's, arm. On the other hand, the RF receiving antenna 40 has a broad effective range for receiving the RF signals (not shown), up to a range having a radius of 5 m around the RF receiving antenna 40. Therefore, the effective reception range of the RF receiving antenna 40 is broad enough to include the effective transmission range of the LF transmission antenna 48.

Each of the control unit 80 of the vehicle-mounted device 16 and the control unit 100 of the portable unit 18 includes a CPU (Central Processing Unit), a ROM (Read Only Memory), a RAM (Random Access Memory), a clock generator, a counter, and a timer (not shown). The CPU automatically carries out a series of calculations or data processing operations according to programs and data stored in the ROM.

The door unlocking sensor 20 and the door locking switch 22, both of which are connected to the control unit 80, output trigger signals serving as activation signals in accordance with the operator's actions. The control unit 80 wirelessly transmits request signals Sr through the LF transmitting circuit 58 and the LF transmission antenna 48 to the portable unit 18, for a predetermined transmission period in response to the input trigger signals.

In this case, every time the operator or driver touches, i.e., operates, either the door unlocking sensor 20 or the door locking switch 22, the door unlocking sensor 20 or the door locking switch 22 outputs a trigger signal having a predetermined pulse level to the control unit 80.

Thus, if the operator touches the door unlocking sensor 20 or the door locking switch 22 in succession, a plurality of pulses are successively input to the control unit 80 from the door unlocking sensor 20 or the door locking switch 22, and then request signals Sr are successively transmitted to the portable unit 18 based on the input pulses.

Meanwhile, because each of the switches outputs one trigger signal pulse to the control unit 80 per each single operation by the operator, if the operator touches the door unlocking sensor 20 for a long period of time, for example, the door unlocking sensor 20 still outputs only one pulse representing the trigger signal to the control unit 80.

The control unit 80 comprises a counter (counting means) 92 and a determination unit (control unit and transmission control unit) 94 in order to suppress a rise in temperature in the LF transmitting circuit 58 and the LF transmission antenna 48, which act together as the transmitting unit, during the transmission period of the request signals Sr.

The counter 92 increases a counted number by adding or incrementing a first preset value thereto at regular time intervals during transmission of the request signals Sr when the request signals Sr are transmitted based on the input trigger signals, that is, during an operation time of the vehicle-mounted device 16. On the other hand, the counter 92 decreases the counted number by subtracting or decrementing a second preset value therefrom at regular time intervals during non-transmission of the request signals Sr when the request signals Sr are not transmitted as a result of no trigger signals being input, that is, during a non-operation time of the vehicle-mounted device 16.

The counted value represents a value counted in relation to the current temperature in the LF transmitting circuit 58 and the LF transmission antenna 48, which together make up the transmitting unit. The incremented first preset value is a value corresponding to a temperature rise coefficient, i.e., temperature raised per unit time in the LF transmitting circuit 58 and the LF transmission antenna 48 during transmission of the request signals Sr. The decremented second preset value is a value corresponding to a temperature drop coefficient, i.e., temperature lowered per unit time in the LF transmitting circuit 58 and the LF transmission antenna 48 during a time when the request signals Sr are not transmitted. The regular time interval is a time interval during which the counter 92 adds one incremented first preset value to another, or subtracts one decremented second preset value from another. The counter 92 sets, for instance, a unit time as the regular time interval. The operation time of the vehicle-mounted device 16 is a period during which current is supplied to the door locking actuator 14 in a so-called keyless entry mode. The non-operation time is a period during which current is not supplied to the door locking actuator 14.

The determination unit 94 compares the counted value obtained by the counter 92 with predetermined threshold values, including a prohibition value (first threshold value) and a lifting value (second threshold value), wherein the determination unit 94 either prohibits or permits transmission of the request signals Sr to the portable unit 18 from the control unit 80 based on the comparison results, thereby prohibiting or permitting operation of the vehicle-mounted device 16.

The prohibition value herein corresponds to a counted value representing an upper limit of the operating temperature of the LF transmitting circuit 58 and the LF transmission antenna 48. Therefore, if the counted value obtained by the counter 92 exceeds the prohibition value, the determination unit 94 judges that the LF transmitting circuit 58 and the LF transmission antenna 48, which operate to transmit the request signals Sr, have deteriorated in quality, because the temperatures in the LF transmitting circuit 58 and the LF transmission antenna 48 have exceeded their upper limit operating temperatures.

The lifting value herein corresponds to a counted value representing a predetermined temperature that is lower than the upper limit of the operating temperature. Therefore, when the counted value obtained by the counter 92 falls to the lifting value or lower, for a first time after the counted value obtained by the counter 92 has once exceeded the prohibition value, then the determination unit 94 judges that the LF transmitting circuit 58 and the LF transmission antenna 48 can properly transmit the request signals Sr, that is, that the vehicle-mounted device 16 can operate without problems, because the current temperatures in the LF transmitting circuit 58 and the LF transmission antenna 48 have fallen to the upper limit operating temperatures thereof or lower.

Thus, the determination unit 94 prohibits transmission of the request signals Sr to the portable unit 18 when the counted value exceeds the prohibition value, and lifts the prohibition when the counted value falls to the lifting value or lower. In other words, the determination unit 94 prohibits operations of the vehicle-mounted device 16, such as unlocking the door, when the counted value exceeds the prohibition value, and lifts the prohibition on operations of the vehicle-mounted device 16 when the counted value falls to the lifting value or lower.

Further, if the determination unit 94 judges that the counted value could potentially exceed the first threshold value before the next regular time interval, the determination unit 94 may then prohibit transmission of the request signals Sr, and thus also prohibit operation of the vehicle-mounted device 16.

Next, effects and advantages of the system (vehicular remote control device) 10 shall be explained while referring to FIGS. 1 through 6.

In the present embodiment, a case in which the operator touches the door unlocking sensor 20 outside of the vehicle 12 in order to unlock the vehicle door shall be explained as an example. In this case, a trigger signal is output from the door unlocking sensor 20 to the control unit 80, in order to carry out authentication between the control unit 80 and the portable unit 18.

Figure 3:
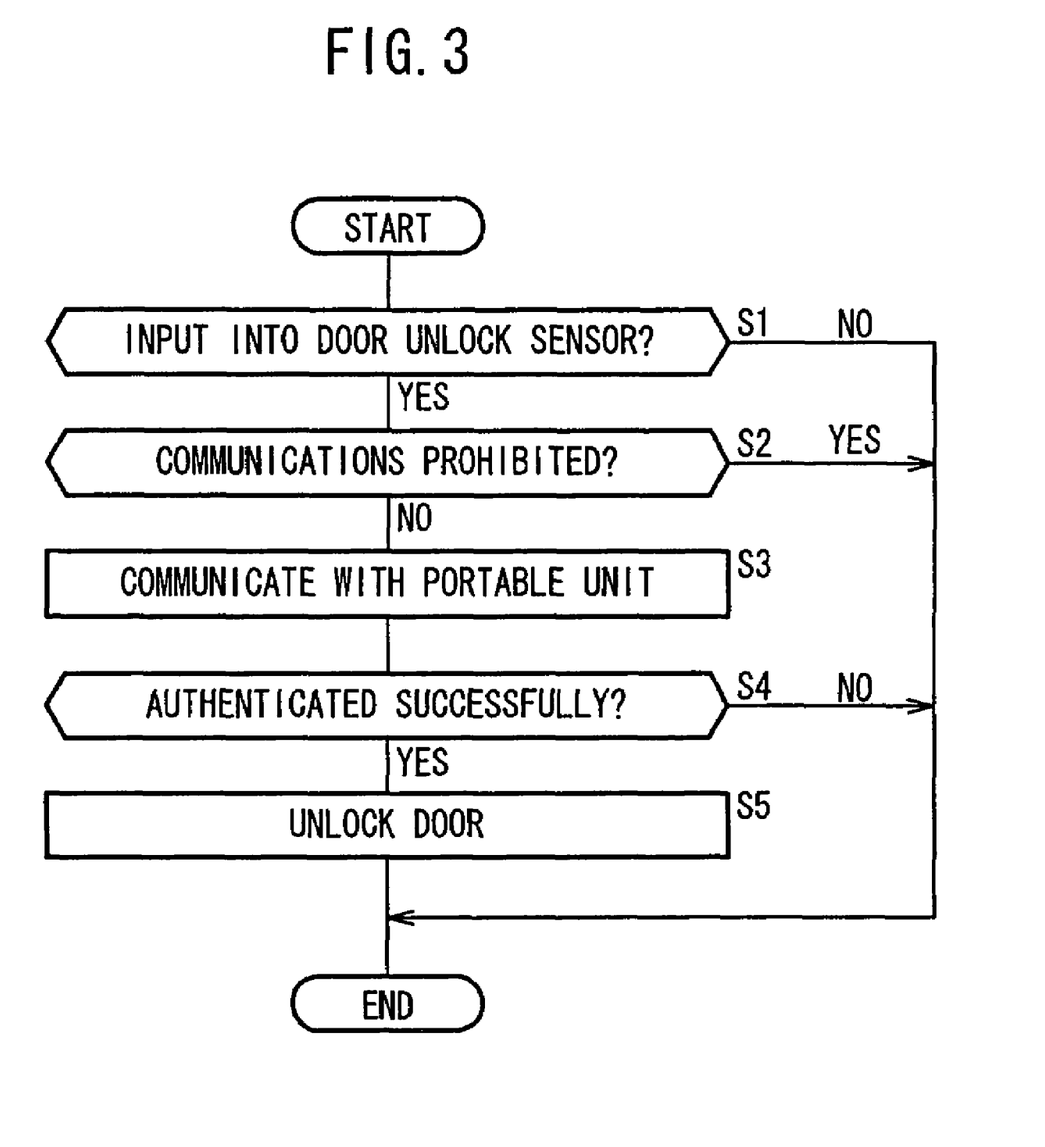
FIG. 3 is a flowchart showing a process for unlocking the doors of a vehicle.

FIG. 3 is a flowchart showing a general unlocking process for unlocking the door of the vehicle 12 (see FIGS. 1 and 2).

In step S1, when an operator outside of the vehicle 12 touches the door unlocking sensor 20, the door unlocking sensor 20 outputs a trigger signal to the control unit 80 at a predetermined level, in response to operation by the operator. The control unit 80 determines whether or not communications between the control unit 80 and the portable unit 18 are currently prohibited (step S2). If not, the control unit wirelessly transmits an LF signal as a request signal Sr (activation request signal) to the portable unit 18 from the LF transmitting circuit 58 and the LF transmission antenna 48 (step S3).

The portable unit 18 receives the request signal Sr at the LF receiving circuit 106 through the LF receiving antenna 108, and passes it to the control unit 100 to initiate the control unit 100 of the portable unit 18 and read out the ID stored in the ROM thereof. Then, the control unit 100 transmits the RF signal as a response signal Sa, including the ID from the RF transmitting circuit 102 and the RF transmission antenna 104, to the vehicle-mounted device 16.

The control unit 80 of the vehicle-mounted device 16 receives the response signals Sa through the RF receiving antenna 40 and the RF receiving circuit 42, and compares an ID contained in the response signal Sa with the ID stored in the ROM of the control unit 80 (step S4). When the IDs are the same, the portable unit 18 is identified as being legitimate, and successfully authenticated. This enables unlocking of the doors in step S5.

When the operator does not touch the door unlocking sensor 20 in step S1, when communications between the control unit 80 and the portable unit 18 are prohibited in step S2, or when authentication is unsuccessful in step S4, the control unit 80 does not unlock the door.

The process for prohibiting or permitting transmission of the request signals Sr, which is controlled by the counter 92 and the determination unit 94 during communications between the control unit 80 and the portable unit 18 in step S3 shown in FIG. 3, shall be explained next referring to FIGS. 4 through 6.

Figure 4:
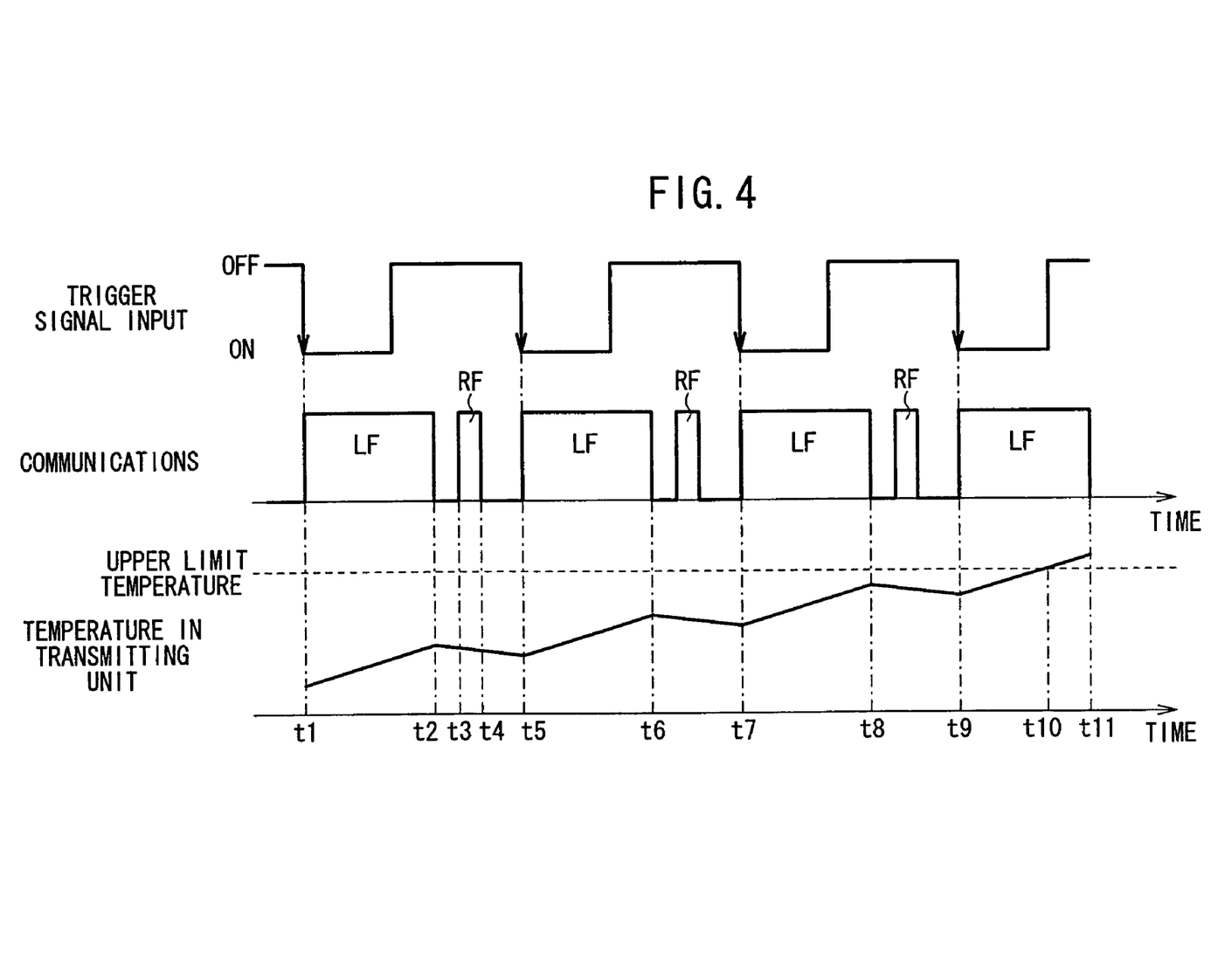
FIG. 4 is a timing chart of a comparative example, showing a rise in temperature in an LF transmitting circuit and a LF transmission antenna, during communications between a control unit and a portable unit.

FIG. 4 is a timing chart illustrating a comparative example, and showing a temperature rise in the LF transmitter circuit and the LF transmission antenna during communications between the control unit and the portable unit.

Figure 5:
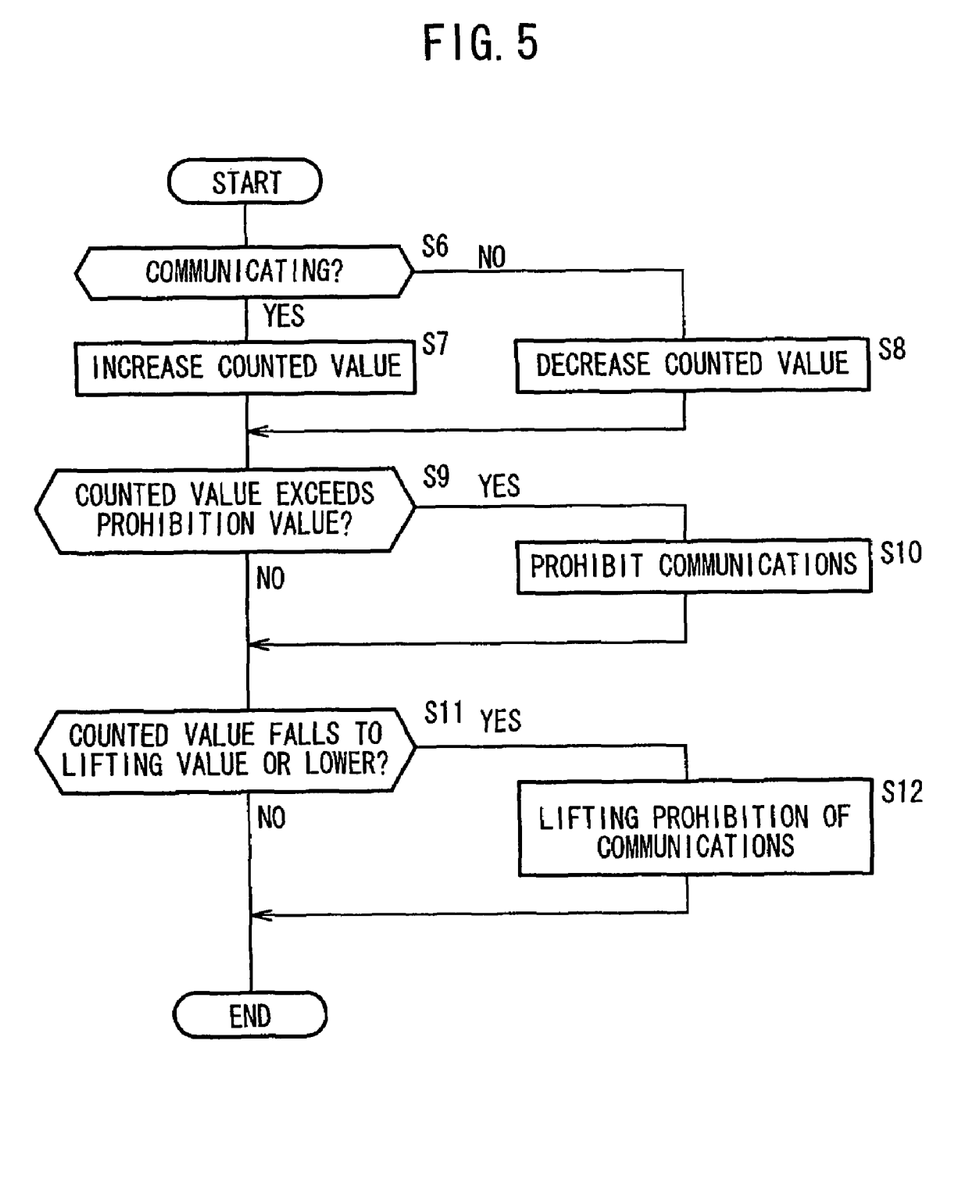
FIG. 5 is a flowchart for showing a process performed within a counter and a determination unit, for determining whether to transmit a request signal or not.

FIG. 5 is a flowchart showing a process for prohibiting or permitting transmission of the request signals Sr, as controlled by the counter 92 and the determination unit 94, wherein the judgment process includes a counting step and a transmission controlling step.

Figure 6:
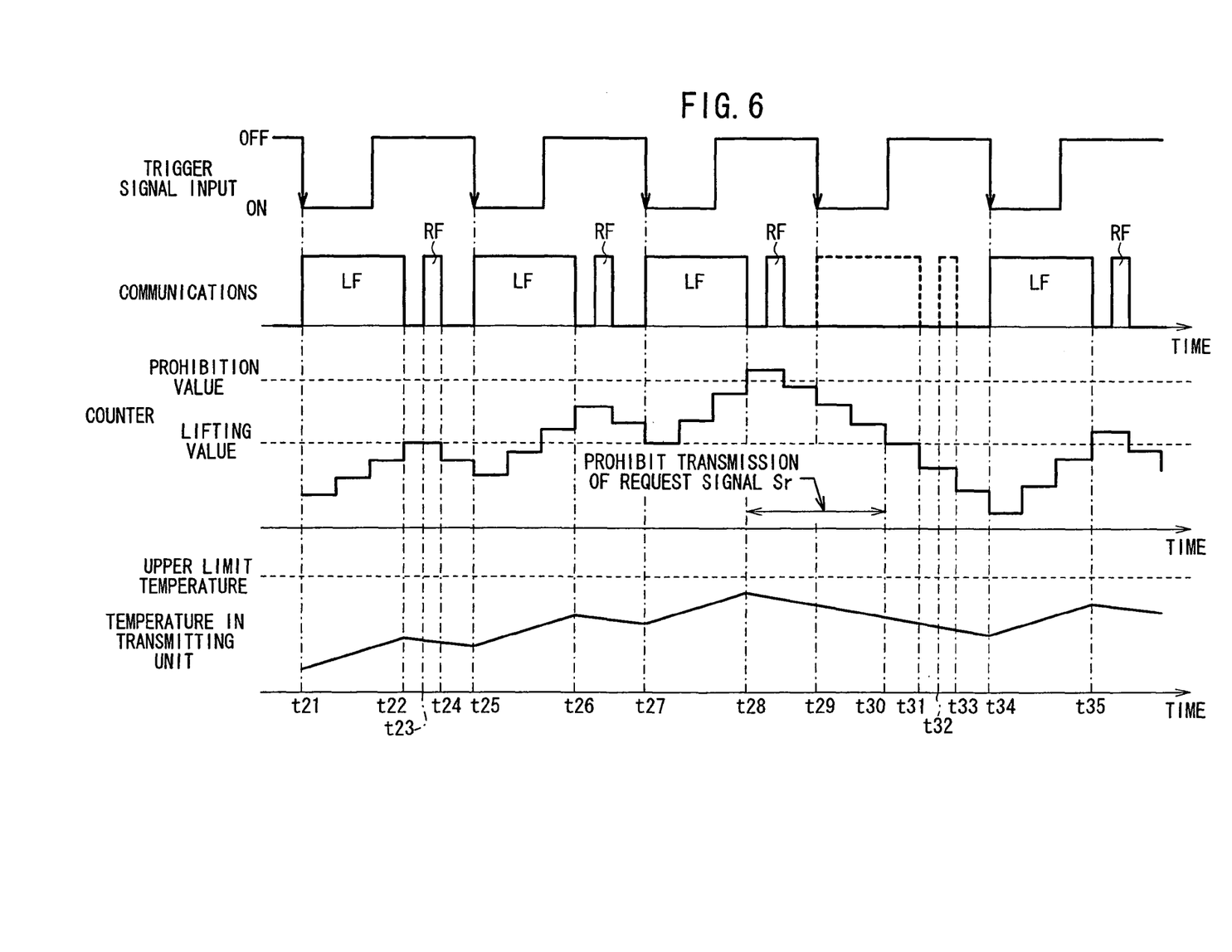
FIG. 6 is a timing chart showing suppression of a rise in temperature in the LF transmitter circuit and the LF transmission antenna, according to the determination shown in FIG. 5, during communications between the control unit and the portable unit.

FIG. 6 is a timing chart showing suppression of the rise in temperature in the LF transmitting circuit 58 and the LF transmission antenna 48, during the aforementioned communications between the control unit 80 and the portable unit 18.

An example in which a trigger signal at a predetermined level (pulses emitted with a constant frequency) is output to the control unit 80 every time the operator touches the door unlocking sensor 20 at regular time intervals shall be explained with respect to this embodiment. This represents a case in which the operator touches the door unlocking sensor 20 multiple times successively for purposes other than unlocking the door. That is, this is not a normal door unlocking process based on a single operation of the door unlocking sensor 20 by the operator, as shown in FIG. 3

The components shown in FIGS. 1 and 2 shall be referred to when necessary while explaining the comparative example shown in FIG. 4.

In the comparative example, as shown in FIG. 4, every time the operator touches the door unlocking sensor 20 at the regular time intervals (i.e., at times t1, t5, t7 and t9), a pulse of the trigger signal having a predetermined level is output, and then the control unit 80 transmits an LF signal, as the request signal Sr, to the portable unit 18 through the LF transmitting circuit 58 and the LF transmission antenna 48, during the transmission time (during each of the periods from t1 to t2, t5 to t6, t7 to t8, and t9 to t11) based on the input trigger signal.

In response to the received request signal Sr, the portable unit 18 transmits an RF signal, as a response signal Sa, to the vehicle-mounted device 16, during a period in which the request signal Sr is not transmitted (during each of the periods from t2 to t5, t6 to t7, and t8 to t9). The response signal Sa is transmitted for a certain period of time, for example, the time corresponding to t3 to t4.

In this case, during the transmission periods from t1 to t2, t5 to t6, t7 to t8, and t9 to t11, temperatures in the LF transmitting circuit 58 and the LF transmission antenna 48, which make up the transmitting unit, increase over time. On the other hand, during the non-transmission periods from t2 to t5, t6 to t7, and t8 to t9, when request signals Sr are not transmitted, the temperatures in the LF transmitting circuit 58 and the LF transmission antenna 48 decrease over time.

However, because the request signal Sr is transmitted to the portable unit 18 every time that a pulse of the trigger signal is input to the control unit 80 at the regular time intervals, at time t10, the temperatures in the LF transmitting circuit 58 and the LF transmission antenna 48 exceed the upper limit operating temperatures of the LF transmitting circuit 58 and the LF transmission antenna 48. Therefore, after time t10, the characteristics of the LF transmitting circuit 58 and the LF transmission antenna 48 tend to deteriorate adversely due to the rise in temperature.

By contrast, as shown in FIG. 5, in the present embodiment, a rise in temperature in the LF transmitting circuit 58 and the LF transmission antenna 48 caused by transmission of the request signals Sr is suppressed by steps S6 to S8, which make up the counting step, as well as by steps S9 to S12, which make up the transmission control step.

Namely, as shown in FIG. 6, whenever the operator touches the door unlocking sensor 20 (see FIGS. 1 and 2) at the regular time intervals (i.e., at times t21, t25, t27, t29 and t34), a trigger signal pulse at a predetermined level is output to the control unit 80. Whenever the input of the trigger signal triggers the request signal Sr, that is, whenever step S6 in FIG. 5 is YES (during each of the periods t21 to t22, t25 to t26, t27 to t28, and t34 to t35), the counter 92 of the control unit 80 increases the counted value by adding an incremented first preset value thereto (step S7) per the regular time interval, for example, during the period between t22 and t24. On the other hand, during periods when the request signal Sr is not transmitted (i.e., periods t22 to t25, t26 to t27, t28 to t34, and after t35), that is, when step S6 in FIG. 5 is NO, the counter 92 decreases the counted value by subtracting a given value therefrom (step S8) per the regular time interval, for example, during each of the periods from t24 to t25, t30 to t31, t31 to t33, and t33 to t34.

The determination unit 94 first compares the counted value obtained by the counter 92 with the prohibition value (step S9). If the counted value exceeds the prohibition value (YES in step S9), the determination unit 94 judges that the temperatures in the LF transmitting circuit 58 and the LF transmission antenna 48 exceed the upper limit of the operating temperature, and prohibits transmission of the request signal Sr to the portable unit 18 (step S10).

On the other hand, if the counted value does not exceed the prohibition value (NO in step S9), operation of the determination unit 94 does not progress to step S10, and hence transmission is not prohibited.

Next, the determination unit 94 compares the counted value with the lifting value (step S11). If the counted value does not exceed (i.e., is at or below) the lifting value (YES in step S11), the determination unit 94 judges that the temperatures in the LF transmitting circuit 58 and the LF transmission antenna 48 have fallen to a predetermined temperature within the range of the operation temperature or lower, and therefore lifts the prohibition and permits transmission of the request signal Sr to the portable unit 18 (step S12).

On the other hand, if the counted value exceeds the lifting value (NO in step S11), the determination unit 94 maintains the present state with respect to communications between the control unit 80 and the portable unit 18. That is, if the control unit 80 and the portable unit 18 are in communication with each other when the operation comes to step S11, then such communications are maintained. However, if transmissions of request signals Sr to the portable unit 18 are prohibited at that time, the determination unit 94 maintains the prohibition of such transmissions.

The present embodiment shall be explained in detail referring to FIG. 6. During the period from t21 to t28, the determination unit 94 (see FIGS. 1 and 2) determines if the counted value does not exceed the prohibition value (NO in step S9) and the lifting value (YES in step S11), or whether the counted value is a predetermined value between the prohibition value and the lifting value (NO in step S11), and then permits transmission of the request signals Sr.

At time t28, because the counted value exceeds the prohibition value (YES in step S9), the determination unit 94 prohibits transmission of request signals Sr to the portable unit 18 (step S10). Then, during the period from t28 to t30, the determination unit 94 continues to prohibit transmission of the request signals Sr, because the counted value still exceeds the prohibition value (YES in step S9), or because the counted value exceeds the lifting value (NO in step S11) even though the counted value does not exceed the prohibition value (NO in step S9).

At time t30, because the counted value does not exceed the prohibition value (NO in step S9) and the lifting value (YES in step S11), the determination unit 94 lifts prohibition of transmission of the request signals Sr. This makes it possible, after time t30, to transmit request signals Sr to the portable unit 18 from the vehicle-mounted device 16. In other words, prohibition of transmission of the request signals Sr is lifted when the counted value falls to the lifting value or lower.

Because transmission of the request signals Sr is prohibited during the period from t28 to t30, and further because the response signals Sa generated in response to the request signals Sr are not received during the period from t30 to t34, communications, such as the LF signal as the request signal Sr and the RF signal as the response signal Sa, during those periods behave as illustrated by the dotted lines in FIG. 6. The response signal Sa is transmitted for a certain time, for example for a period of time corresponding to t23 to t24, during periods when the request signals Sr are not transmitted, that is, during each of the periods from t22 to t25, t26 to t27, t28 to t34, and after t35.

Although the above explanations exemplify a case in which mutual authentication between the control unit 80 and the portable unit 18 is carried out based on the trigger signal caused by operation of the door unlocking sensor 20 by the operator, similar explanations are also applicable to a case in which the trigger signal is output from the door locking switch 22.

As mentioned above, in the present embodiment, when trigger signals are successively input to the control unit 80 in response to successive operations of the door unlocking sensor 20 or the door locking switch 22 by the operator, the counter 92 increases or decreases the counted value, thereby determining whether or not transmission of the request signal Sr based on the trigger signal can be permitted, that is, whether the vehicle-mounted device 16 can be properly operated, at that time. Further, the determination unit 94 prohibits transmission of the request signals Sr, and thus controls operation of the vehicle-mounted device 16, based on comparison of the counted value with the prohibition value. The determination unit 94 also permits transmission of the request signals Sr based on comparison of the counted value with the lifting value.

Namely, during the time that the request signals Sr are transmitted based on the input trigger signals (t21 to t22, t25 to t26, t27 to t28, and t34 to t35), the temperatures of the LF transmitting circuit 58 and the LF transmission antenna 48 rise. On the other hand, during the non-transmission period when the request signals Sr are not transmitted (t22 to t25, t26 to t27, t28 to t34, and after t35), the temperatures of the LF transmitting circuit 58 and the LF transmission antenna 48 drop. The counter 92 therefore increases the counted value by adding or incrementing a first preset value thereto per the regular time interval, in response to rises in temperature in the LF transmitting circuit 58 and the LF transmission antenna 48, during the transmission period of the request signals Sr, that is, during the operation time of the vehicle-mounted device 16. Further, the counter 92 decreases the counted value by subtracting or decrementing a second preset value therefrom per the regular time interval, in response to a drop in temperature in the LF transmitting circuit 58 and the LF transmission antenna 48, during the non-transmission time of the request signal Sr, that is, during the non-operation time of the vehicle-mounted device 16. The determination unit 94 compares the counted value, which corresponds to current temperatures in the LF transmitting circuit 58 and the LF transmission antenna 48, with the prohibition value and the lifting value, in order to prohibit or permit transmission of the request signal Sr, and thus to control operation of the vehicle-mounted device 16.

Normally, mutual authentication between the vehicle-mounted device 16 and the portable unit 18 is conducted based on the input of a trigger signal from the door unlocking sensor 20, or when the door locking switch 22 is operated by the operator. In addition to normal authentication, even when the operator successively operates the above-mentioned switches such that a plurality of trigger signals are input to the control unit 80 of the vehicle-mounted device 16, the present invention can ensure transmission of the request signal Sr to the portable unit 18, that is, operation of the vehicle-mounted device 16 can be ensured, while suppressing rises in temperature in both the LF transmitting circuit 58 and the LF transmission antenna 48 due to transmission of the request signal Sr, or stated otherwise, due to operation of the vehicle-mounted device 16.

Further, according to the present embodiment, because transmission of the request signal Sr is prohibited or permitted based on the results of comparing the counted value with the prohibition value and the lifting value, it is possible to reduce the cost of the vehicle-mounted device 16.

Also, because prohibition and permission of transmission of the request signals Sr are determined using the prohibition value and the lifting value, both prohibition and permission of transmission of the request signal Sr are reliably controlled corresponding to rises in temperature in the LF transmitting circuit 58 and the LF transmission antenna 48.

The prohibition and permission of transmission of the request signal Sr is efficiently controlled as well by lifting the prohibition of transmission of the request signals Sr whenever the counted value falls to the lifting value or lower, after having prohibited transmission of the request signals Sr due to the counted value exceeding the prohibition value.

The LF transmitting circuit 58 and the LF transmission antenna 48 are reliably prevented from becoming deteriorated due to rises in temperature, by prohibiting transmission of the request signals Sr to the portable unit 18 whenever the determination unit 94 determines that the counted value could exceed the prohibition value before the next time interval.

Further, reliable transmission of the request signals Sr within the range of the operating temperature can be achieved by setting the prohibition value as a value reflecting the upper limit operating temperature of the LF transmitting circuit 58 and the LF transmission antenna 48, and by setting the lifting value as a predetermined value reflecting a temperature that is lower than limit temperature and within the range of the operating temperature.

Although certain preferred embodiments of the present invention have been shown and described in detail, it should be understood that various changes and modifications may be made to the embodiments without departing from the scope of the invention as set forth in the appended claims.

What is claimed is:

1. A vehicular remote control device configured for controlling transmission of a request signal when the request signal is transmitted to a portable unit from a transmitting unit of a vehicle-mounted device, based on a trigger signal input from a predetermined switch of a vehicle operated by an operator, comprising:

a counting unit configured for increasing a counted value at predetermined regular time intervals during a transmission time of said request signal in response to inputting of said trigger signal, while decreasing said counted value at said predetermined regular time intervals during a non-transmission time of said request signal; and a transmission control unit configured for controlling permission and prohibition of transmission of said request signal based on comparison of said counted value with a predetermined threshold value, wherein said threshold value comprises a first threshold value and a second threshold value that is lower than said first threshold value, and wherein said control unit is configured to prohibit transmission of said request signal when said counted value exceeds said first threshold value, and permits transmission of said request signal when said counted value falls to the second threshold value or lower.

2. The vehicular remote control device according to claim 1, wherein prohibition of transmission of said request signal is lifted in order to permit transmission of said request signal when said counted value falls to said second threshold value or lower.

3. The vehicular remote control device according to claim 1, wherein transmission of said request signal is prohibited when said control unit judges that said counted value exceeds said first threshold value before a next regular time interval.

4. The vehicular remote control device according to claim 1, wherein said counting unit increases said counted value by adding a first preset value to said counted value at said regular time intervals during the transmission time of said request signal, and decreases said counted value by subtracting a second preset value from said counted value at said regular time intervals during the non-transmission time of said request signal.

5. A method of vehicular remote control for controlling transmission of a request signal when the request signal is transmitted to a portable unit from a transmitting unit of a vehicle-mounted device based on a trigger signal input from a predetermined switch of a vehicle operated by an operator, comprising:

a counting step for increasing a counted value at predetermined regular time intervals during a transmission time of said request signal in response to inputting of said trigger signal, while decreasing said counted value at said predetermined regular time intervals during a non-transmission time of said request signal; and a transmission controlling step for controlling permission and prohibition of transmission of said request signal based on comparison of said counted value with a predetermined threshold value, wherein said threshold value comprises a first threshold value and a second threshold value that is lower than said first threshold value, and wherein said controlling step prohibits transmission of said request signal when said counted value exceeds said first threshold value, and permits transmission of said request signal when said counted value falls to said second threshold value or lower.

6. The method of vehicular remote control according to claim 5, wherein said transmission controlling step lifts prohibition of transmission of said request signal in order to permit transmission of said request signal when said counted value falls to said second threshold value or lower.

7. The method of vehicular remote control according to claim 5, wherein said transmission control step prohibits the operation of said vehicle-mounted device when it is judged in said transmission control step that said counted value exceeds said first threshold value before a next regular time interval.

8. The method of vehicular remote control according to claim 5, wherein said counting step increases said counted value by adding a first preset value to said counted value at said regular time intervals during the transmission time of said request signal, and decreases said counted value by subtracting a second preset value from said counted value at said regular time intervals during the non-transmission time of said request signal.

* * * * *